United States Patent [19]
Price

[11] 3,774,039
[45] Nov. 20, 1973

[54] PHOTOELECTRIC APPARATUS FOR DETECTING LIGHT REFLECTED FROM AN OBJECT

[75] Inventor: Earl T. Price, San Jose, Calif.

[73] Assignee: Scientific Technology Incorporated, Mountain View, Calif.

[22] Filed: Mar. 5, 1973

[21] Appl. No.: 338,179

Related U.S. Application Data

[63] Continuation of Ser. No. 195,330, Nov. 3, 1971, abandoned.

[52] U.S. Cl. ............... 250/552, 250/221, 356/211
[51] Int. Cl. .......................................... H01j 39/12
[58] Field of Search ..................... 250/216, 217 CR, 250/217 SS, 222 R, 227, 239, 221, 206; 340/228 S; 356/209, 211

[56] References Cited
UNITED STATES PATENTS

| | | |
|---|---|---|
| 2,032,588 | 3/1936 | Miller, Jr. .................... 250/216 X |
| 2,906,885 | 9/1959 | Orthuber et al. ............... 250/222 R |
| 3,247,391 | 4/1966 | Ogle et al. ........................ 250/216 |
| 3,334,236 | 8/1967 | Bacon........................... 250/217 CR |
| 3,474,252 | 10/1969 | Jacobsen........................... 250/216 |
| 3,509,353 | 4/1970 | Sundblad et al. ................. 250/227 |
| 3,654,477 | 4/1972 | Benjamin, Jr.................. 250/217 SS |

Primary Examiner—Walter Stolwein
Attorney—Harold C. Hohbach

[57] ABSTRACT

A photoelectric apparatus including a light emitting diode mounted at the center of a lens for emitting light with the lens serving to focus emitted light reflected from objects upon a photodetector axially disposed behind the diode, and an electrical system for cyclically energizing said light emitting diode at a predetermined frequency and amplifier means tuned to said frequency and applying its amplified output signal to a circuit which develops a control signal when the input signal exceeds a predetermined adjustable value.

3 Claims, 5 Drawing Figures

INVENTOR.
Earl T. Price

PHOTOELECTRIC APPARATUS FOR DETECTING LIGHT REFLECTED FROM AN OBJECT

This is a continuation, of application Ser. No. 195330 filed Nov. 3, 1971, now abandoned.

BACKGROUND OF THE INVENTION

This invention relates generally to photoelectric apparatus and more particularly to a photoelectric apparatus having coaxial optical paths and a selective electrical system.

The prior art discloses photoelectric systems which have included optical means for concentrating a light beam and a photoelectric means for receiving the light reflected from an object. These systems have in general necessitated accurate alignment of the optical system and/or special lens arrangements. Such systems have in general been sensitive to ambient light conditions.

OBJECTS AND SUMMARY OF THE INVENTION

It is a general object of the present invention to provide an improved photoelectric apparatus and system.

It is another object of the present invention to provide a photoelectric apparatus which emits pulses of light at a predetermined frequency and which includes frequency selective circuits for receiving the light to thereby provide immunity to ambient light condition and line voltage fluctuations.

It is another object of the present invention to provide a photoelectric system which uses coaxial optical paths for the emitted and reflected light.

It is a further object of the present invention to provide a photoelectric system which provides digital compatible output signals.

The foregoing and other objects of the invention are achieved by a system which includes a lens and a photodetector mounted coaxially behind said lens whereby the lens focuses reflected light onto said detector and a light emitting diode mounted at the center of said lens to emit light away from the lens with surrounding portions of the lens serving to receive the reflected light and direct it to the photodetector and together with means for energizing said light emitting diode at a predetermined frequency and means associated with said photodetector output for selecting signals of said predetermined frequency and developing an output signal when the detector output exceeds a predetermined amplitude.

DESCRIPTION OF PREFERRED EMBODIMENTS

Figure 1:
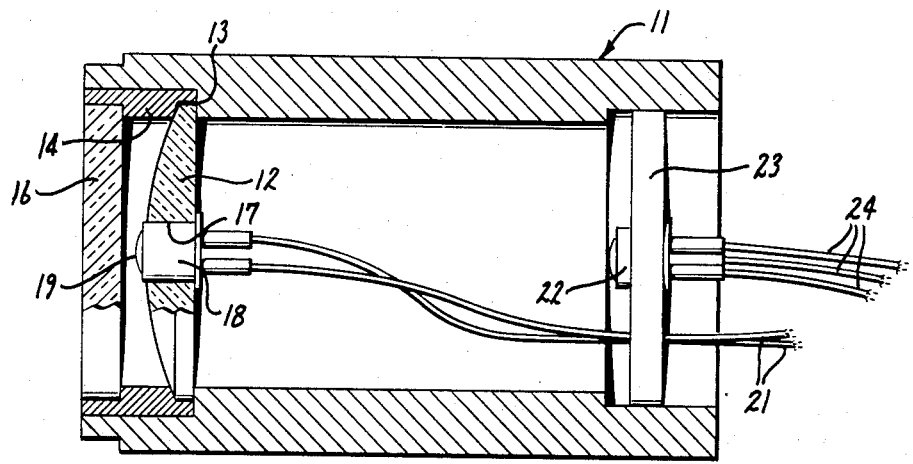
FIG. 1 is an elevational view partly in section of the coaxial optical assembly in accordance with the present invention.
Figure 2:
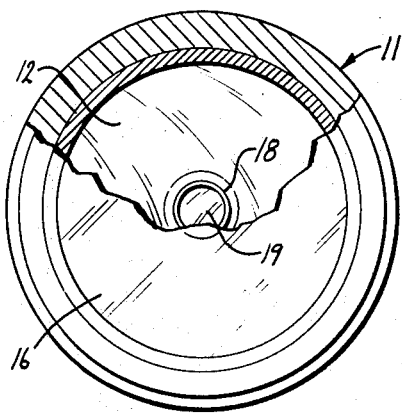
FIG. 2 is a front view of the assembly shown in FIG. 1.

The coaxial optical assembly is shown in FIGS. 1 and 2. The assembly includes a cylindrical housing 11 with a transparent convex lens 12 mounted at one end of the housing. The lens may, for example, be retained by means of a retainer ring 13 and insert 14. The insert 14 holds transparent window 16 which protects lens 12. The lens is provided with an axial hole 17. A light emitting diode 18 is mounted in the axial hole 17 with the front surface 19 adjacent the front surface of the lens. The light emitting diode is energized through suitable electrical wires, for example, the wires 21.

Axially disposed behind the lens 12 is a photodetector 22. The photodetector 22 is mounted at the center of disc 23 which is held within the cylindrical housing. Suitable leads 24 receive the output of the photodetector and apply it to associated circuits to be presently described.

Figure 3:
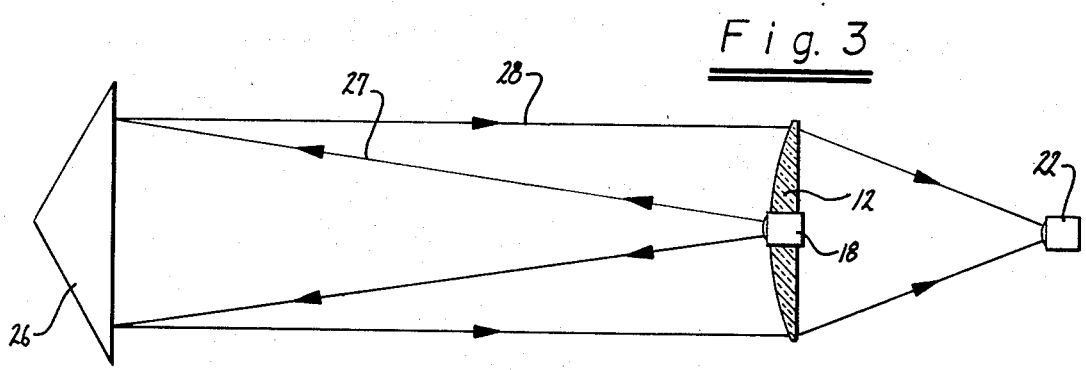
FIG. 3 is a schematic ray diagram of the system as used in a retro-reflective detecting system.

Referring now particularly to FIG. 3, the optical assembly is shown schematically in a retro-reflective detection system. In the retro-reflective system, reflector 26 is positioned to receive light emitted by the light emitting diode. The light received by the retro-reflector is included within the rays 27, all other light passing beyond the retro-reflector. The retro-reflector reflects the light as shown by the rays 28. The reflected light strikes the convex lens 12 and is focused on the photodetector 22. If the light path between the light emitting diode and the retro-reflector is interrupted, the light striking the photodetector is reduced and its output provides an electrical signal representative thereof.

Figure 4:
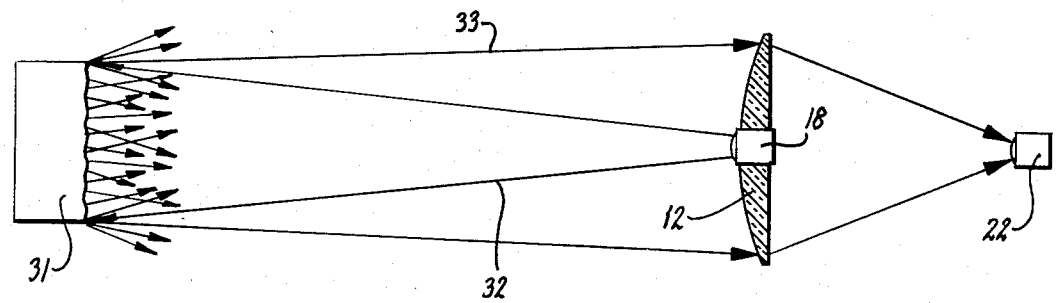
FIG. 4 is a schematic ray diagram showing the system employed to receive diffused reflections from objects.

The optical system may also be used in connection with the reflection of light from the object itself. Referring to FIG. 4, an object 31 is shown in the path of the rays emitted by the light emitting diode and defined by the rays 32. The light is diffusely reflected by the object 31 and the diffused light defined by the rays 33 strikes the lens 12 and is focused on the photodetector 22. The detector provides an output signal.

It is observed that the optical system is pre-aligned and does not need alignment when in use. The photodetector and light emitting diode and lens are mounted in the housing 11 in coaxial arrangement and require no on site focusing or alignment.

Figure 5:
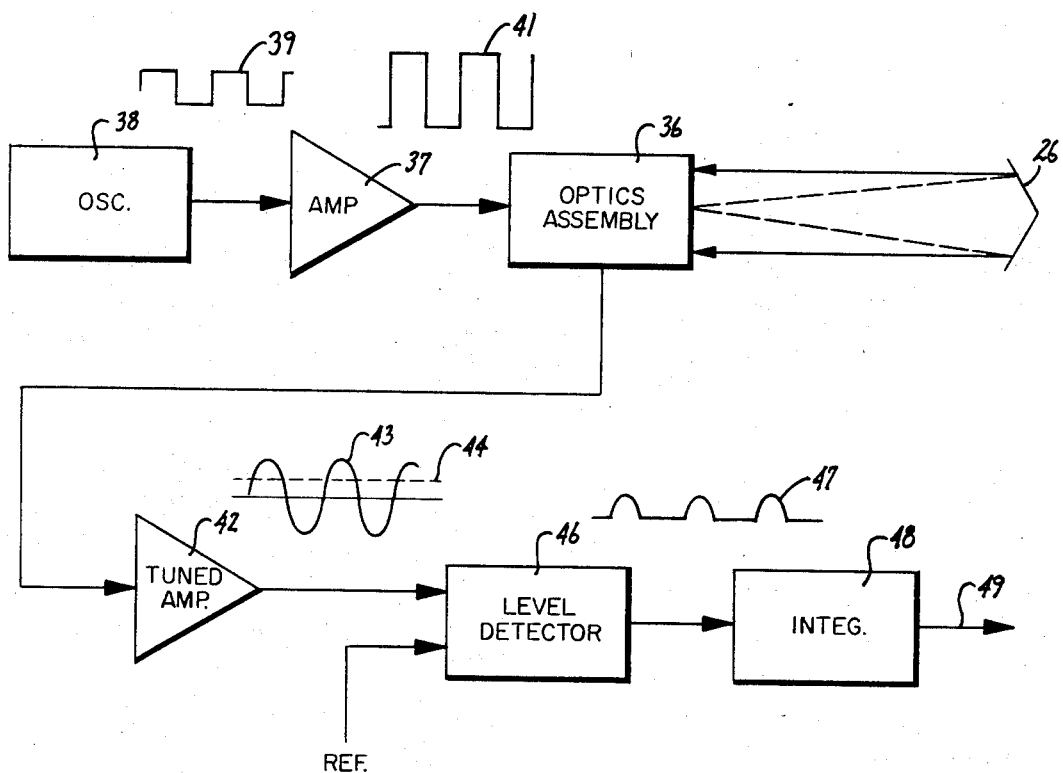
FIG. 5 is a block diagram showing the electrical system serving to energize the optical system and receive and analyze the photodetector output.

Referring to FIG. 5, the optics assembly is shown generally at 36 with an associated reflector 26. The remainder of the figures shows the electrical circuits associated with the optical assembly for driving the light emitting diode and for receiving and amplifying the output signal of the photodetector.

The light emitting diode is driven by modulated amplifier means 37. The amplifier means is modulated by an input signal from oscillator 38. Referring to the drawing, the oscillator 38 provides a squarewave output signal 39 which serves to turn on and off the amplifier which provides an amplified squarewave signal such as illustrated at 41 having a 50 per cent duty cycle. This serves to turn on and off the light emitting diode at a frequency corresponding to the frequency of the oscillator 38. Thus, the light emitted by the light emitting diode is in the form of light pulses which travel outwardly therefrom to impinge upon objects. As a result, diffused light reflected by an object or light from the retroreflector picked up by the lens system and focused on the photodetector 22 excites the detector to provide an output signal having a frequency component corresponding to the frequency of the light emitting diode. This signal is applied to a tuned amplifier 42 which amplifies the signal as shown at 43. The signal is applied to a level detector which also receives a reference voltage. Referring to the figure, the reference voltage is schematically shown at 44. The level detector serves to pass only signal which has an amplitude greater than the reference voltage whereby the output of the level detector 46 is a series of pulses 47. These pulses are applied to an integrator 48 which provides a d.c. output signal at the terminal 49, which signal can be employed to drive associated relays, circuits or other apparatus.

It is to be observed that in the present system by adjusting the reference voltage the sensitivity of the system can be adjusted whereby ambient light and other stray signals are rejected by the level detector and the level detector only provides an output when the input signal exceeds this predetermined value. This occurs only when the reflected signal having the oscillator frequency received and amplified by the tuned amplifier exceeds this value.

Thus, there is provided an improved photoelectric system in which the optical components are pre-aligned at the factory and which can be easily installed. The system is relatively immune to ambient conditions. The response level can be adjusted to eliminate most stray light and voltage fluctuations to offer highest possible sensitivity.

I claim:

1. A photoelectric system including a lens, a photodetector mounted coaxially behind said lens, a light emitting diode mounted axially in said lens and extending to the front of said lens to emit light away from the lens, said lens serving to receive emitted light reflected from objects in front of said lens to focus the light on said photodetector, means for alternately energizing and extinguishing said light emitting diode at a predetermined frequency, means for receiving the output of the photodetector, said last named means tuned to said predetermined frequency to provide an output only when pulsating light at said predetermined frequency is reflected and received, and a level detector for receiving the output from the means tuned to said predetermined frequency and providing output pulses when the input exceeds a predetermined level.

2. A photoelectric system as in claim 1 wherein said level detector includes means for adjusting the level of input signal at which an output signal is generated, together with an integrator for receiving said level detector output and providing a DC output for indicating presence of objects in front of said lens.

3. A photoelectric system as in claim 1 including a reflector spaced from said light emitting diode to reflect light into said lens together with means for receiving the output of said level detector, said last named means providing an indication when the reflected light is interrupted.

* * * * *